United States Patent [19]

Smith

[11] Patent Number: 4,844,297

[45] Date of Patent: Jul. 4, 1989

[54] FLUID DISPENSING APPARATUS AND METHOD OF OPERATION THEREOF

[75] Inventor: John A. G. Smith, London, Great Britain

[73] Assignee: Darenth Equipment, Ltd., Kent, United Kingdom

[21] Appl. No.: 79,958

[22] Filed: Jul. 31, 1987

[51] Int. Cl.⁴ .............................................. B65B 1/34
[52] U.S. Cl. ........................................ 222/1; 222/14; 222/256; 222/331; 141/83; 141/128
[58] Field of Search ................................ 141/83, 128; 177/122–123; 239/104, 106, 110, 536; 222/14, 21–22, 49, 63, 256, 260, 282, 310, 330–331, 333, 410, 504, 55, 63, 1

[56] References Cited

U.S. PATENT DOCUMENTS

| | | | |
|---|---|---|---|
| 1,880,562 | 10/1932 | Weckerly | 177/123 X |
| 2,866,579 | 12/1958 | Roozee | 222/390 X |
| 3,488,699 | 1/1970 | Lee et al. | 366/272 X |
| 3,856,097 | 12/1974 | Bartlo et al. | 177/123 X |
| 3,918,475 | 11/1975 | Trusselle | 141/128 |
| 4,211,263 | 7/1980 | Kennedy et al. | 141/128 |
| 4,222,448 | 9/1980 | Sunkle et al. | 177/122 X |
| 4,401,141 | 8/1983 | Rosen et al. | 222/14 X |
| 4,498,843 | 2/1985 | Schneider et al. | 222/14 X |

FOREIGN PATENT DOCUMENTS 3439193 4/1986 Fed. Rep. of Germany ...... 239/110

Primary Examiner—Michael S. Huppert
Attorney, Agent, or Firm—Fisher, Christen & Sabol

[57] ABSTRACT

Apparatus for dispensing a desired quantity by weight of a fluid material such as a liquid color printing ink for shade mixing purposes includes a container (1) for the fluid material to be dispensed, a main fluid material dispensing discharge outlet (2) on the container (1) and a secondary fluid material dispensing discharge outlet (3) on the container (1). The container further includes a movable pressure assembly plate to apply a pressure to the fluid to dispense the fluid from the discharge outlets. The secondary dispensing dischage outlet (3) incorporates a gear pump (5) which is adjustably operable to dispense a particular volume of fluid material corresponding to a particular weight of fluid material to be dispensed. The pressure plate assembly (4) includes a presser plate (21) slidably movable in the container (1) in sealed contact with side walls (1a) of the container (1) to engage directly or indirectly the upper surface of fluid material in the container (1). A piston and cylinder assembly (23) is operative to urge the plate (21) towards and away from fluid material in the container (1).

31 Claims, 8 Drawing Sheets

FLUID DISPENSING APPARATUS AND METHOD OF OPERATION THEREOF

FIELD OF INVENTION

This invention relates to a fluid dispensing apparatus particularly suitable for dispensing a measured quantity of coloured liquid printing ink by weight according to the quantity of a coloured ink required to be mixed with measured quantities of other coloured printing inks for ink constituents to make up the desired colour ink mix, and to a method of dispensing a measured quantity of a fluid material such as a liquid printing ink by weight.

BACKGROUND OF THE INVENTION AND PRIOR ART

Known liquid printing ink colour mixing methods generally involve colour matching the required shade and presenting the desired shade in terms of a 100 part mixing formula by weight of different base colour inks, dispensing the required amounts of the selected base colour inks to the mixing formula requirements to give the desired total weight of the finished shade ink, and mixing the dispensed base colour inks. Provided that the correct 100 part mixing formula is selected, the basic problem in achieving the desired shade ink is in dispensing and mixing correct quantities of the base colour inks called for by the 100 part mixing formula.

Conventional dispensing techniques and apparatus which dispense the base colour inks by volume or by weight are not sufficiently accurate for mixing printing inks for tinplate printing where the base colour inks may be particularly viscous and vary considerably in specific gravity from one colour to another due to the different weight pigments employed. Additionally such conventional dispensing techniques and apparatus can be quite slow in operation again due to the ink viscosity and need for accurate dispensing of a desired quantity.

OBJECTS OF THE INVENTION

There is thus a need for a generally improved apparatus for dispensing a fluid material such as a liquid printing ink and for a generally improved dispensing method for dispensing desired quantities of fluid component materials of a mixture such as liquid base colour printing inks to the desired quantities called for by a particular colour shade formula.

It is another object of the invention to provide apparatus for and a method of dispensing a fluid material such as ink which is sufficiently accurate for mixing printing ink for tinplate printing where the base colour inks are viscous and vary considerably in specific gravity from one colour to another.

SUMMARY OF THE INVENTION

According to one aspect of the present invention there is provided apparatus for dispensing a desired quantity by weight of a fluid material such as liquid base colour printing ink for shade mixing purposes, which apparatus includes a container for the fluid material to be dispensed, a main fluid material dispensing discharge outlet means on the container, a secondary fluid material dispensing discharge outlet means on the container, which secondary fluid material dispensing discharge outlet means is adjustably operable to dispense a particular volume of fluid material corresponding to a particular weight of fluid material to be dispensed, and means for applying pressure to fluid material when in the container to urge it towards both said outlet means, the arrangement being such that to dispense a desired weight of a fluid material over a certain weight from the apparatus into a receptacle therebelow on a weighing scale, the means for applying pressure to the fluid material in the container is operated to urge the fluid material in the container towards the main and secondary outlet means, the main and secondary outlet means are actuated, fluid material is dispensed from both the outlet means into the receptacle, the main outlet means is closed when a predetermined major weight of fluid material has been dispensed, below the desired weight, into the receptacle, the secondary outlet means is shut-off when a predetermined secondary weight of fluid material has been added to the predetermined main weight of fluid material in the receptacle to bring the weight of the dispensed material in the receptacle closer to and below the desired weight, the dispensed fluid material in the receptacle is weighed to give an actual weight value, the weight difference between the desired weight and the actual weight is calculated, the secondary outlet means is actuated to dispense the weight difference into the receptacle, and the final weight of dispensed fluid material in the receptacle is weighed for checking purposes, and the arrangement being such that to dispense a desired weight of fluid material below a certain weight from the apparatus into a receptacle therebelow on a weighting scale, the means for applying pressure to the fluid material in the container is operated to urge the fluid material in the container towards the main and secondary outlet means, the secondary outlet means only is actuated to dispense fluid medium therefrom into the receptacle until a predetermined weight of fluid material below the desired weight has been dispensed and then shut-off, the dispensed fluid material in the receptacle is weighed to give an actual weight value, the weight difference between the desired weight and the actual weight is calculated, the secondary outlet means is actuated to dispense the weight difference into the receptacle and the final weight of dispensed fluid material in the receptacle is weighed for checking purposes.

Advantageously the secondary outlet means includes a gear pump having a drivable rotatable toothed rotor member and a meshing idler gear contained in a housing chamber in fluid communication, at an inlet side of the rotor member and gear, with the container and at the outlet side of the rotor member and gear with an outlet nozzle assembly of the secondary outlet means, the secondary outlet means also including a drive motor operable to rotate the rotor member in steps each of which corresponds to a specific volume of fluid material dispensed from the secondary outlet means, so that any required weight of fluid material can be dispensed by rotation of the rotor member by the number of steps equivalent to the desired weight of fluid material to be dispensed, with the weight of a particular fluid material dispensed in a rotor member step movement being previously ascertained by weighing for the particular fluid material being dispensed.

Conveniently the outlet nozzle assembly of the secondary outlet means includes a substantially cylindrical nozzle member having a fluid flow passage therethrough opening into a discharge aperture through one end of the nozzle member and having an external surface at said discharge aperture end tapering towards the discharge aperture, a housing member around at least said tapered end of the nozzle member, an annular sheet-like membrane secured around it outer edge to said housing member so that its inner edge lies closely adjacent to the tapered end of the nozzle member adjacent and around the discharge aperture therethrough, which tapered external surface of the nozzle member, surrounding housing member and membrane define therebetween a substantially annular chamber, and an inlet opening into said substantially annular chamber through which a gas under pressure, preferably compressed air, can be fed from a source into the substantially annular chamber and from thence through the gap between the nozzle member end and inner edge of the membrane, across the out end of the discharge aperture through the nozzle member to blow away therefrom any fluid material remaining thereon, for cleaning purposes.

Preferably the main outlet means includes an outlet passage and a ball valve selectively actuable to open or close said passage to flow of fluid material therethrough from the container.

Advantageously the container is substantially cylindrical in shape having a closed base at one end in and on which the main and secondary outlet means are provided, and an openable and closeable lid at the other end, which lid preferably is hingeably connected to said container.

Conveniently the means for applying pressure to fluid material when in the container is a presser plate slidably movable in the container in sealed contact with the side walls thereof to engage the upper surface, via an intermediate sheet membrane, a fluid material in the container, and a piston and cylinder assembly operative to urge the presser plate towards and away from the fluid material in the container, said piston and cylinder assembly having a cylinder fixably secured to the container lid substantially perpendicular thereto and a piston rod extensible from the cylinder and connected at its outermost end to the presser plate substantially perpendicularly thereto.

Preferably the presser plate is provided with a guide rod projecting therefrom substantially parallel to the piston rod and projecting through an opening in the container lid, said guide rod visually indicating the position of the presser plate in the container and hence the volume of fluid material remaining in the container, a contact switch being associated with the guide rod and operative to indicate the position of the guide rod corresponding to the half empty state of the container.

Advantageously the presser plate incorporates an air bleed valve operable to bleed air from the container from the fluid material side of the presser plate.

According to a further aspect of the present invention there is provided a method of dispensing a desired quantity by weight of a fluid material such as a liquid base colour printing ink for shade mixing purposes, including the steps of positioning a fluid material container provided with a main fluid material dispensing discharge outlet means and a secondary fluid material dispensing discharge outlet means, above a receptacle on a weighing scale, urging fluid material in the container towards said main and secondary outlet means, actuating either the main and secondary outlet means together when a weight of fluid material over a certain weight is to be dispensed, or the secondary outlet means only when a weight of fluid material less than a certain weight is to be dispensed, to dispense fluid material into the receptacle, closing the main outlet means, if actuated, when a predetermined major weight of fluid material has been discharged below the desired weight into the container, and then shutting-off the secondary outlet means when a predetermined secondary weight of fluid material has been added to the predetermined main weight of fluid material in the receptacle to bring the weight of the dispensed fluid material in the receptacle close to and below the desired weight, or shutting-off the secondary outlet means, if the main outlet means has not been actuated, when a predetermined weight of fluid material below the desired weight has been dispensed into the receptacle, weighing the fluid material in the receptacle to give an actual weight value, calculating the weight difference between the desired weight and the actual weight, actuating the secondary outlet means to dispense the weight difference of fluid material into the fluid material in the receptacle, and weighing the fluid material in the receptacle for checking purposes.

Advantageously the secondary outlet means includes a gear pump and a drive motor operable to actuate the gear pump in steps each of which corresponds to a specific volume of fluid material dispensed from the secondary outlet means, in which method any required weight of fluid material can be dispensed from the secondary outlet means by rotation of the gear pump by the number of steps equivalent to the desired weight of fluid material to be dispersed from the secondary outlet means, and in which the weight of a particular fluid material dispensed in a single gear pump actuation step is ascertained by previously weighing the amount of the particular fluid material dispensed in a known number of gear pump actuation steps and calculating from the weighed amount the weight dispensed in a single gear pump actuation step.

Conveniently the gear pump is reversed in movement at the end of each secondary outlet means dispensing actuation to such back residual fluid material from a discharge aperture of a nozzle member of the secondary outlet means to keep the discharge aperture clear and gas under pressure, preferably compressed air, is blown across the outside of the nozzle member discharge aperture to remove any remaining fluid material hanging therefrom.

According to another aspect of the present invention there is provided apparatus for dispensing desired weights of a plurality of fluid materials such as liquid base colour printing inks for shade mixing purposes, including a plurality of dispensing apparatus as hereinbefore described, one for each particular fluid material to be dispensed, at least one weighing scale and at least one receptacle on the scale for receiving the or each liquid material, the weighing scale with carried receptacle, and plurality of dispensing apparatus, being movable relative to one another selectively to bring each selected dispensing apparatus in turn into registry with the receptacle and weighing scale for dispensing purposes, and control means including a micro computer and a memory for storing the weight of each particular fluid material in each dispensing apparatus corresponding to an actuating step of each secondary outlet means gear pump, and for controlling the dispensing a fluid material from each dispensing apparatus in accordance with a 100 part by weight formula inserted in the control means and the sequence of dispensing from each dispensing apparatus.

BRIEF DESCRIPTION OF THE DRAWINGS

For a better understanding of the present invention, and to show how the same may be carried into effect, reference will now be made, by way of example, to the accompanying drawings, in which.

DETAILED DESCRIPTION OF THE DRAWINGS

Figure 1:
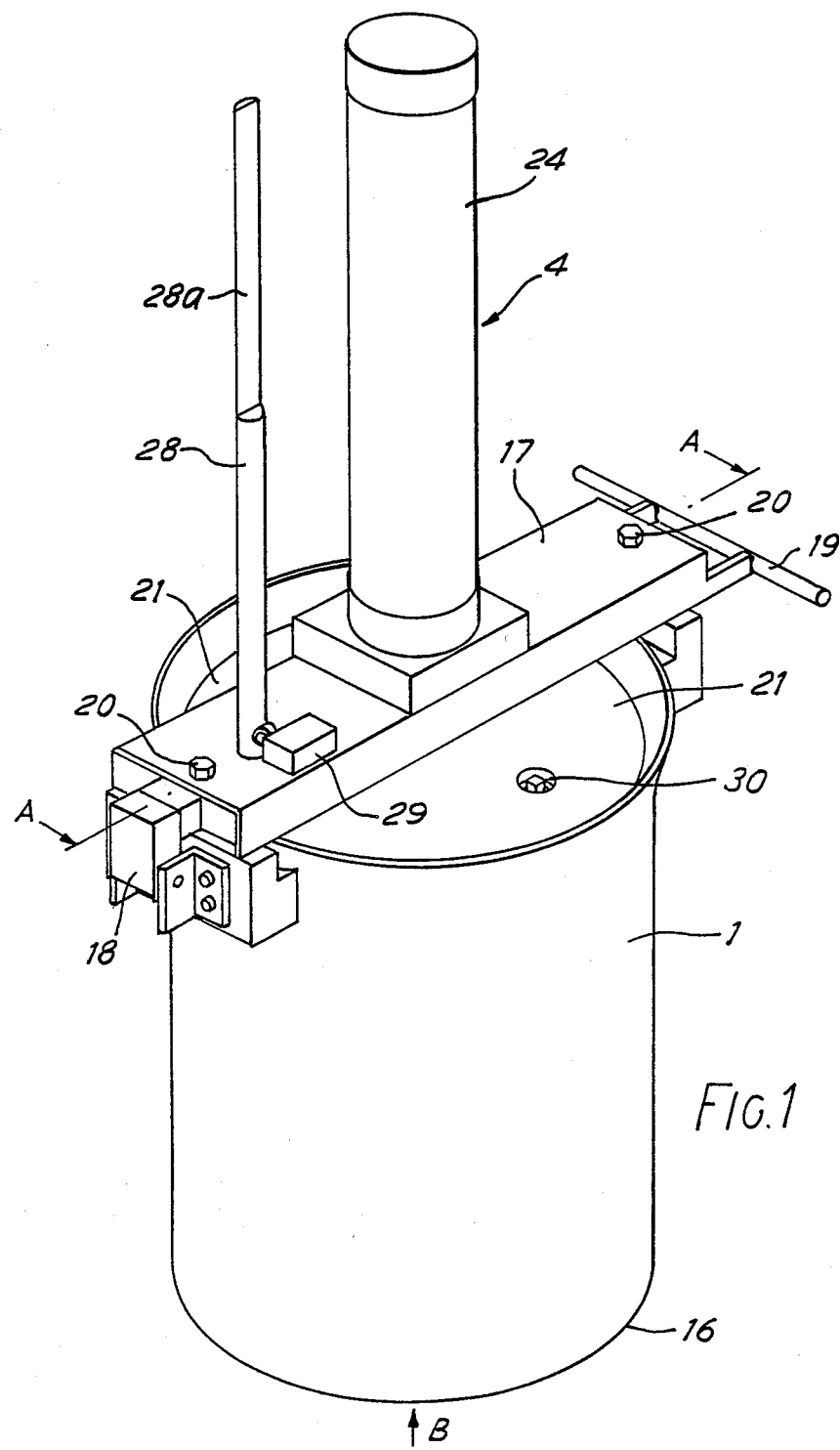
FIG. 1 is a diagramatic perspective view from above of a fluid material dispensing apparatus according to a first embodiment of the invention.

A fluid dispensing apparatus according to one embodiment of the present invention has been illustrated, for convenience, in terms of an example of the apparatus suitable for dispensing a measured quantity of a coloured liquid printing ink by weight according to the quantity of the coloured ink required to be mixed with measured quantities of other colour printing inks or ink constituents to make up the desired colour ink mix according to the requirement of a one hundred part by weight mixing formula for the desired colour shade. Such a dispensing apparatus basically includes a container 1 for the fluid materials such as ink to be dispersed, a main fluid material dispersing discharge outlet means generally indicated at 2 on the container 1, a secondary fluid material dispensing discharge outlet means generally indicated at 3 on the container 1 and means generally indicated at 4 for applying pressure to fluid material when in the container 1 to urge it towards both said outlet means 2 and 3.

The secondary means 3 is adjustably operable to dispense a particular volume of fluid materials such as liquid ink corresponding to a particular weight of ink to be dispensed. To this end the means 3 preferably includes a gear pump 5 of the kind having a drivable rotatable toothed rotor member and meshing idler gear (not shown) contained in a housing chamber in fluid communication at an inlet side 5a of the rotor member and gear with the container 1 and at the outlet side 5b of the rotor member and gear with an outlet nozzle assembly generally indicated at 6 in FIG. 3, of the outlet means 3. The secondary means 3 also includes a drive motor 7 operable to rotate the rotor member of the gear pump 5 in steps each of which corresponds to a specific volume of liquid ink dispensed from the secondary outlet means 3. In this way any required weight of liquid ink can be dispensed by rotation of the rotor member of the gear pump 5 by the number of steps equivalent to the desired weight of ink to be dispensed. The weight of a particular fluid material to be dispensed in a rotor member step movement can be previously ascertained by weighing for the particular fluid material being dispensed. In other words, as different colour liquid inks may have different specific gravity and weight characteristics depending on their individual makeup it is possible, with the secondary outlet means 3 of this invention effectively to calibrate the gear pump 5 so that the weight of material dispensed per turn of the rotor member can be previously ascertained by actually rotating the rotor member by a predetermined number of steps of turns and weighing the amount of material dispensed for this movement. As the characteristics of the particularly liquid ink will be constant this value can be used for all dispensing operations from the container 1 containing the particular ink. If, in subsequent operation of the apparatus of the invention, a different fluid material or liquid ink is placed in the container 1 a similar calibration operation can be carried out for that particular ink giving a different ink weight dispensed for the same number of turns or steps movements of the rotor member of the gear pump 5. In this way it is possible to dispense accurately desired fine weights of fluid material such as a liquid ink with the apparatus of the invention and easily to correct operation of the apparatus for different inks with different flow, weight and specific gravity characteristics.

Figure 3:
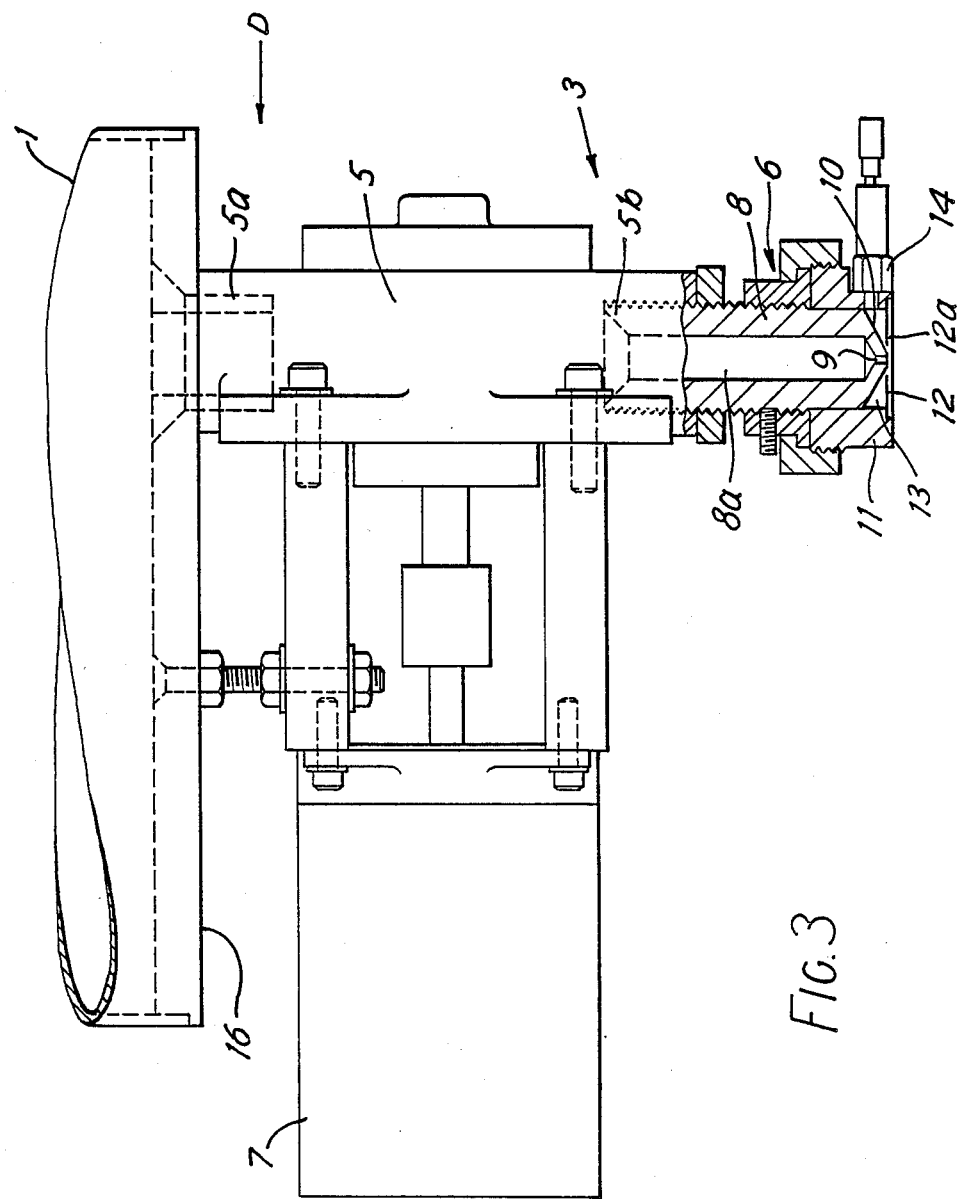
FIG. 3 is a partial vertically sectioned view to an enlarged scale of the bottom part of the dispensing apparatus of FIG. 1 taken along the line A—A thereof, again to an enlarged scale.
Figure 4:
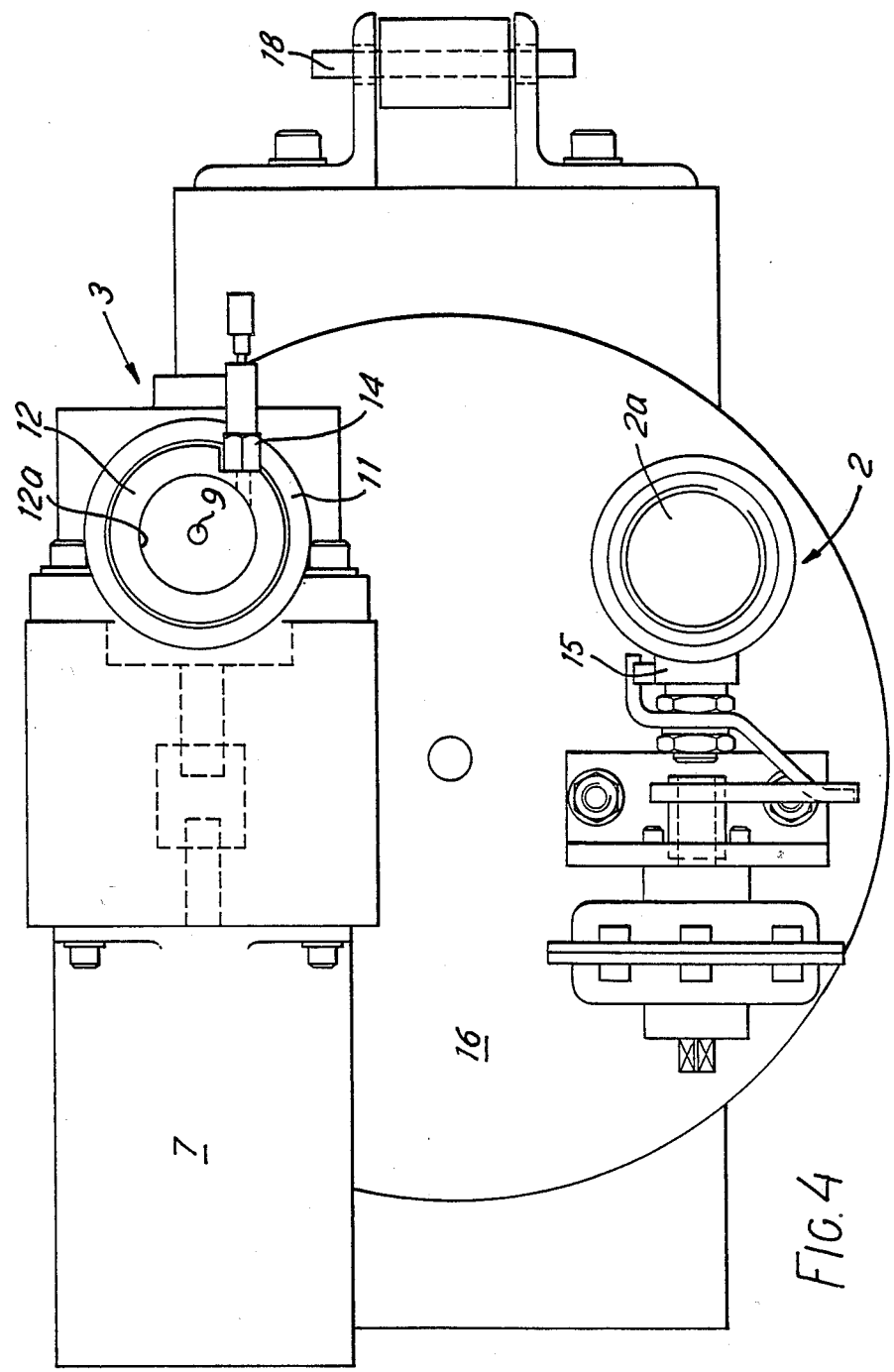
FIG. 4 is a view from below of the apparatus of FIGS. 1, 2 and 3 taken in the direction of the arrow B in FIG. 1, to the same scale as FIGS. 2 and 3.
Figure 5:
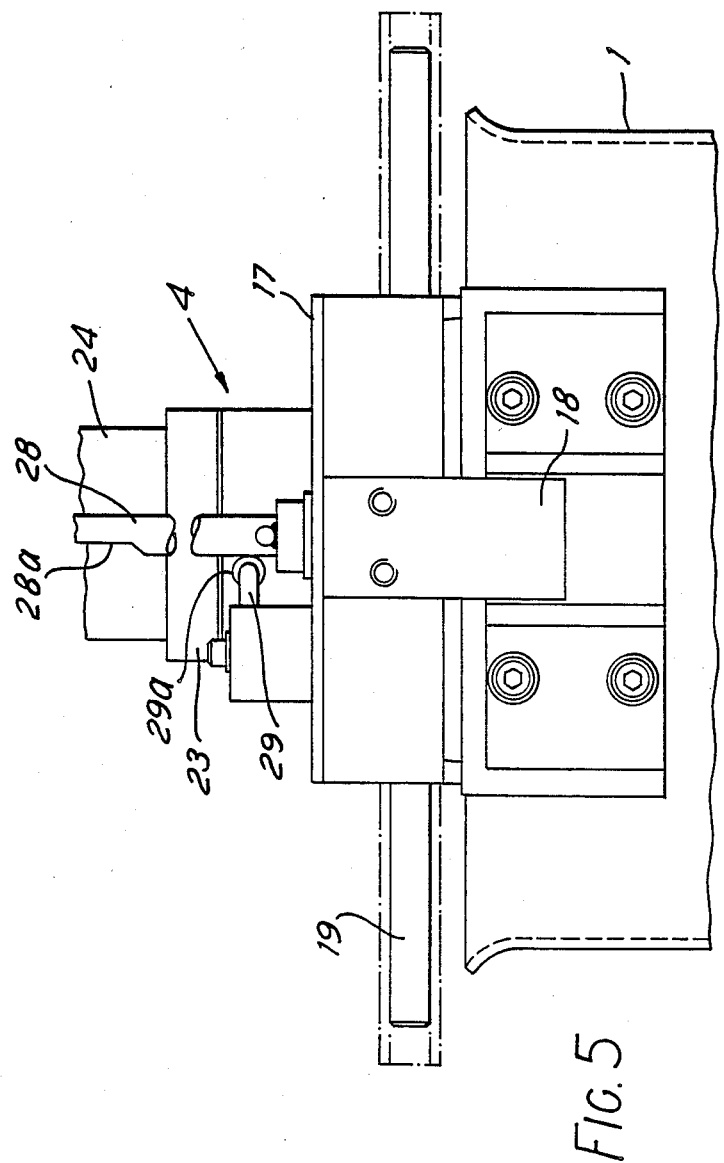
FIG. 5 is a side view of the top portion of the apparatus of FIGS. 1 to 4 taken in the direction of the arrow C as shown in FIG. 2.
Figure 6:
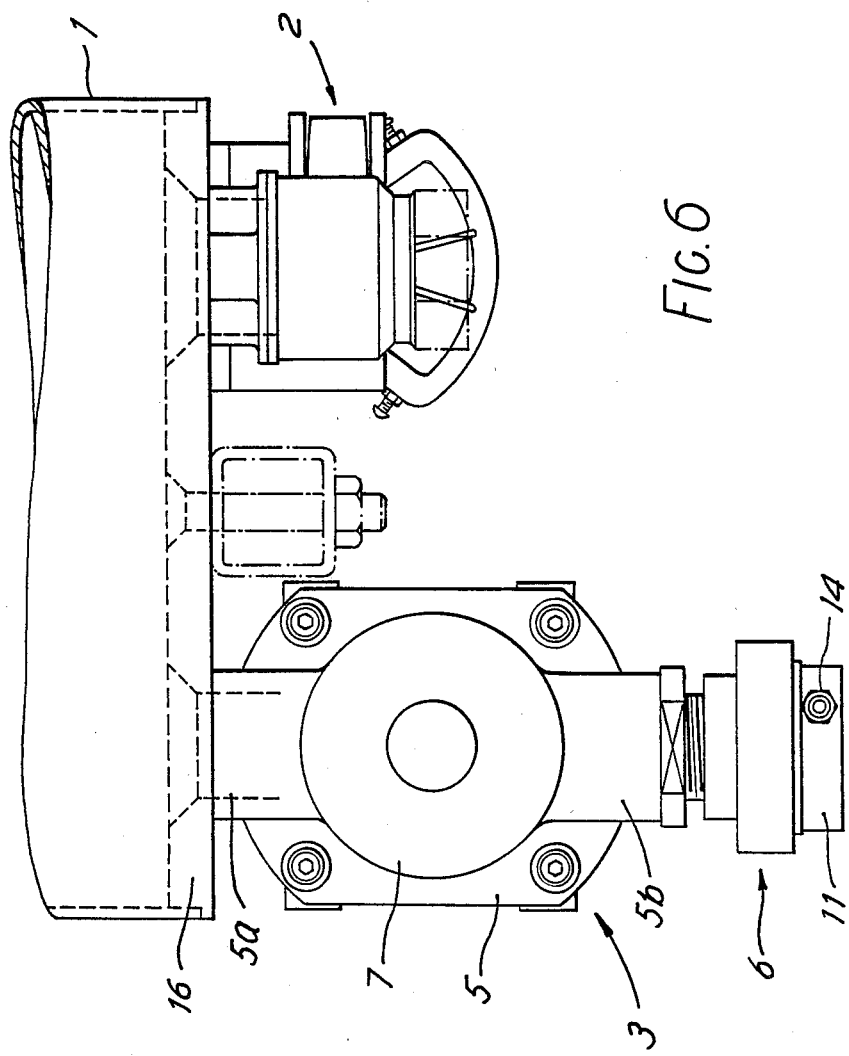
FIG. 6 is an end view of the bottom portion of the apparatus of FIGS 1 to 5, taken in the direction of the arrow D as shown in FIG. 3.

The outlet nozzle assembly 6 includes a substantially cylindrical nozzle member 8 as can be seen from FIG. 3. The nozzle member 8 has a fluid flow passage 8a therethrough opening into a discharge aperture 9 through one end of the nozzle member 8. An external surface 10 at the discharge aperture end of the nozzle member 8 tapers towards the discharge aperture 9. The outlet nozzle assembly 6 also includes a housing member 11, conveniently in the form of an annular sleeve removably securable around the discharge aperture end of the nozzle member 8 at least around the tapered surface 10 thereof.

Also forming part of the nozzle assembly 6 is an annular sheet-like membrane 12 made of any convenient flexible material such as plastics, metal or stiff rubber. This annular membrane 12 is secured around its outer edge to the housing member 11, conveniently by being recessed in a recess provided for this purpose in the outer end of the bore through the housing member 11 as illustrated in FIG. 3. The manner of securing the membrane 12 to the housing member 11 and the manner of securing the housing member 11 to and around the nozzle member 8 are such that the inner edge 12a of the annular membrane 12 around its inner opening, lies closely adjacent to the tapered end surface 10 of the nozzle member 8 adjacent and around the discharge aperture 9 therethrough. In this way an annular gap is defined between the edge 12a of the annular membrane 12 and the tapered surface 10, which gap can be accurately controlled in dimensions by varying the longitudinal position of the housing member 11 relative to the nozzle member 8.

The tapered external surface 10 of the nozzle member 8, surrounding housing member 11 and membrane 12 thereby define therebetween a substantially annular chamber 13 into which the gap between the inner edge 12a of the membrane 12 and tapered external surface 10 of the nozzle member 8, opens adjacent the discharge aperture 9. At a position radially remote from the discharge aperture 9 an inlet 14 opens into the chamber 13 through the external wall of the housing member 11. This inlet 14 can be put in communication with a source of gas under pressure, such as compressed air, so that the gas under pressure can be fed into the chamber 13 and from thence through the gap between the nozzle member tapered end surface 10 and inner edge 12a of the membrane 12 across the outer end of the discharge aperture 9 through the nozzle member 8 to blow away therefrom any fluid material such as liquid ink remaining thereon, for cleaning purposes.

The main fluid material dispensing discharge outlet means 2 preferably includes an outlet passage 2a and a ball valve 15 selectively actuable to open or close the passage 2a to flow a fluid materials such as liquid ink therethrough from the container 1.

As shown in the accompanying drawings, in the illustrated example of the apparatus of the invention, the container 1 is substantially cylindrical in shape having a closed base 16 at one end in and on which the main and secondary outlet means 2 and 3 are provided. The container 1 also includes an openable and closable lid 17 at its other end, which lid 17 preferably is hingedly connected as at 18 to the container 1. As illustrated the lid 17 need not completely close off the open upper end of the container 1 but may take the form of a bar hingedly connected at one end 18 to the container 1 and carrying a handle 19 at its opposite end. Releasable means such as turn screws 20 may be provided for releasably securing the lid 17 in place across the open upper end of the container 1.

Figure 2:
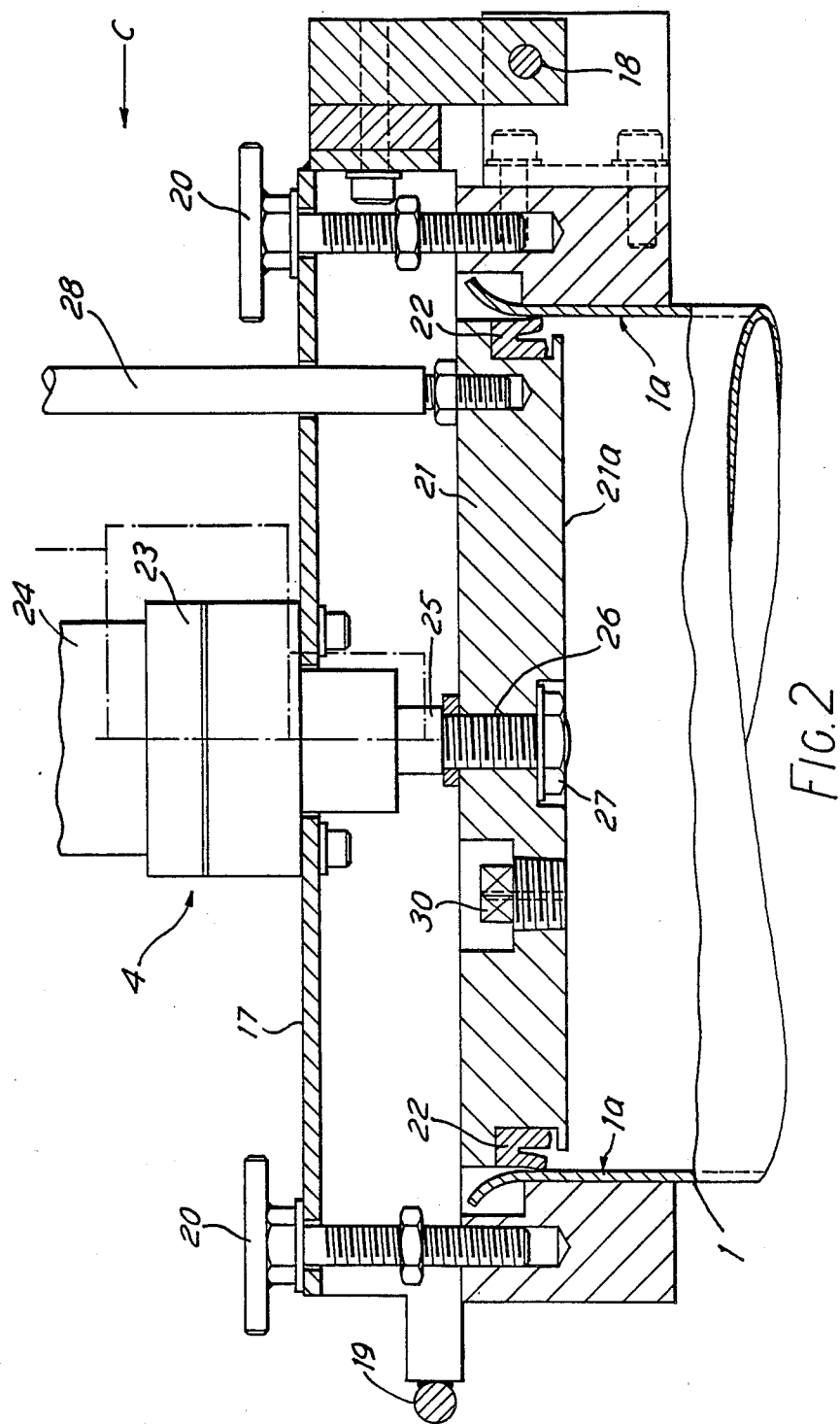
FIG. 2 is a vertically sectioned view of a top portion of the apparatus of FIG. 1 taken along the line A—A in FIG. 1, but to an enlarged scale.

In the illustrated example where the lid 17 is in the form of a bar the means 4 for applying pressure for the fluid material such as liquid ink in the container 1 includes a presser plate 21 which is cylindrical in shape, and which in cooperation with the bar forming the lid 17 provides an end closure for the container 1. This presser plate 21 is slidably movable in the container 1 in sealed contact such as with an annular edge seal 22, as shown in FIG. 2, with the side walls 1a of the container 1. The presser plate 21 is operable to engage the upper surface, via intermediate sheet membrane (not illustrated) preferably made of paper, of the fluid material such as ink in the container 1, via the under surface 21a of the presser plate 21. To produce this movement of the presser plate 21 up and down in a container 1 the means 4 also includes a piston and cylinder assembly generally indicated at 23 operative to urge the presser plate 21 towards and away from the fluid material such as liquid ink in the container 1. The piston and cylinder assembly 23 includes a cylinder 24 fixably secured to the container lid 17 substantially perpendicularly thereto and substantially coaxially with the longitudinal axis through the container 1. The assembly 23 also includes a piston rod 25 slidably housed in the cylinder 24 and extensible therefrom. The piston rod is connected at its outermost end to the presser plate 21 in any convenient manner such as by passing through an aperture 26 through the centre of the presser plate 21 and being secured on the under surface 21a thereof to the presser plate 21 in any convenient manner such as by a nut 27. The piston rod 25 also is connected to the presser plate 21 coaxially with the longitudinal axis through the container 1 and extends substantially perpendicularly to the presser plate 21. The presser plate 21 may be provided with a guide rod 28 projecting therefrom substantially parallel to the piston rod 25 and projecting through an opening in the container lid 17. This guide rod 28 visually indicates the position of the presser plate 21 in the container 1 and hence the volume of fluid material remaining in the container. One convenient way of doing this is to provide a relieved face 28a part way along the guide rod 28 at a position approximately to the container 1 being half full of fluid material. Additionally a contact switch 29 may be provided associated with the guide rod 28 on the container lid 17 to indicate the position of the guide rod 28 corresponding to the half empty state of the container 1. Conveniently this is done by the switch 29 including a spring loaded roller 29a running on the side of the guide rod 28 so that when the roller 29a encounters the relieved face 28a of the guide rod 28 the subsequent longitudinal displacement under the force of the spring urging the roller 29a into contact with the periphery of the guide rod 28, actuates the switch 29 which can serve to trigger a warning indicator such as a light to draw attention to the state of the container 1 for replenishment purposes. Additionally the presser plate 21, as illustrated in FIGS. 1 and 2 incorporates an air-bleed valve 30 operative to bleed air from the container 1 from the fluid material side of the presser plate 21.

The method of dispensing a desired quantity by weight of a fluid material such as a liquid base colour printing ink for shade mixing purposes from the apparatus of FIGS. 1 to 6 involves positioning the container 1 in which liquid ink to be dispensed is contained, above a receptacle (not shown) on a weighing scale (not shown). Then the presser plate 21 is urged towards the liquid ink in the container into contact therewith urging the ink towards the main and secondary outlet means 2 and 3 at the base of the container 1. Conveniently the container 1 is of a size sufficient to contain about 20 kilogrammes of liquid ink.

If the amount of liquid ink to be dispensed is over a certain weight, such as over fifty grammes, the main and secondary outlet means 2 and 3 are both actuated together. Ink dispensed from both outlet means 2 and 3 together into the receptacle on the weighing scale and when a predetermined major weight of ink, such as about ten grammes less than the final desired weight has been dispensed into the receptacle, the main outlet means 2 is closed by means of its ball valve 15.

The secondary outlet means 3 is continued in operation until a predetermined secondary weight of liquid ink such as a further eight grammes, has been added to the predetermined main weight of ink in the receptacle, so bringing the weight of the dispensed material in the receptacle closer to and below the desired weight, such as within about two grammes of the desired weight. The secondary outlet means 3 is then shut-off by stopping rotation of the gear pump 5 via the motor 7 and the dispersed ink material in the receptacle on the weighing scales is weighed to give an actual weight value. The weight difference between the desired weight and the actual weight is calculated and the secondary outlet means 3 is actuated once more to dispense the weight difference, approximately two grammes in this case, into the receptacle by rotating the gear pump through the number of steps or rotations of the rotor member previously ascertained to produce the desired dispensed weight of two grammes. The secondary outlet means gear pump 5 is then stopped to close the secondary outlet means 3 and the final weight of dispensed ink in the receptacle is weighed for checking purposes. If the final weight is within the allowed tolerances the dispensed ink is passed to the next stage in the mixing procedure. If the final weight is outside the desired weight tolerances the operator of the apparatus will decide whether or not to use the weighed amount of ink and will check the apparatus for corrective action to be taken.

If it is wished to dispense a desired weight of liquid ink below a certain weight, such as blow a weight of ten grammes, from the apparatus the presser plate 21 is actuated to urge the ink in the container 1 towards the main and secondary outlet means 2 and 3 but secondary outlet means 3 only is actuated to dispense fluid material such as liquid ink therefrom into the receptacle on the weighing scales until a predetermined weight of fluid material such as ink of less than the desired weight, such as about eight grammes, has been dispensed, and is then shut-off. The dispensed liquid ink in the receptacle is weighed to give an actual weight value and the weight difference between the desired weight and the actual weight is calculated. The secondary outlet means gear pump 5 is then reactuated to dispense the weight difference, approximately two grammes, into the receptacle and then closed once more and the final weight of dispensed liquid ink in the receptacle is weighed for checking purposes as before.

As previously indicated the number of steps or turns required to displace the rotor member in the gear pump 5 can be determined for any particular fluid material to be dispensed depending upon its particular flow, specific gravity and weight characteristics. The stepper motor 7 in general can operate the gear pump 5 and the rotor member thereof at about 400 steps per revolution making possible a very fine control of the amount of fluid material dispensed from the secondary outlet means 3. It is a simple matter to dispense into an empty receptacle as much ink from the container 1 as dispensed by say 400 turns of the motor 7 and gear pump rotor member, and calculate from this what weight is dispensed in one turn. For that particular ink in the container 1 it is a simple matter thereafter to calculate the number of steps the stepper motor 7 must be operated to produce the required fine control weight of ink to be dispensed from the secondary outlet means 3. Additionally a further way of improving the accuracy of the weigh of ink dispense from the secondary outlet means 3 lies in the use of the blast of compressed air through the inlet 14 through the gap between the tapered surface of the nozzle member 8 and inner edge 12a of the membrane 12 across the outer end of the discharge aperture 9 to remove waste liquid ink therefrom. Moreover when the stepper motor 7 is stopped to stop operation of the gear pump 5 it can immediately after stopping be reversed in direction to reverse the direction of movement of the gear pump 5 and thus act to suck any remaining liquid ink in the discharge aperture 9 back up the flow passage 8a to prevent such material blocking the aperture. 9.

Figure 7:
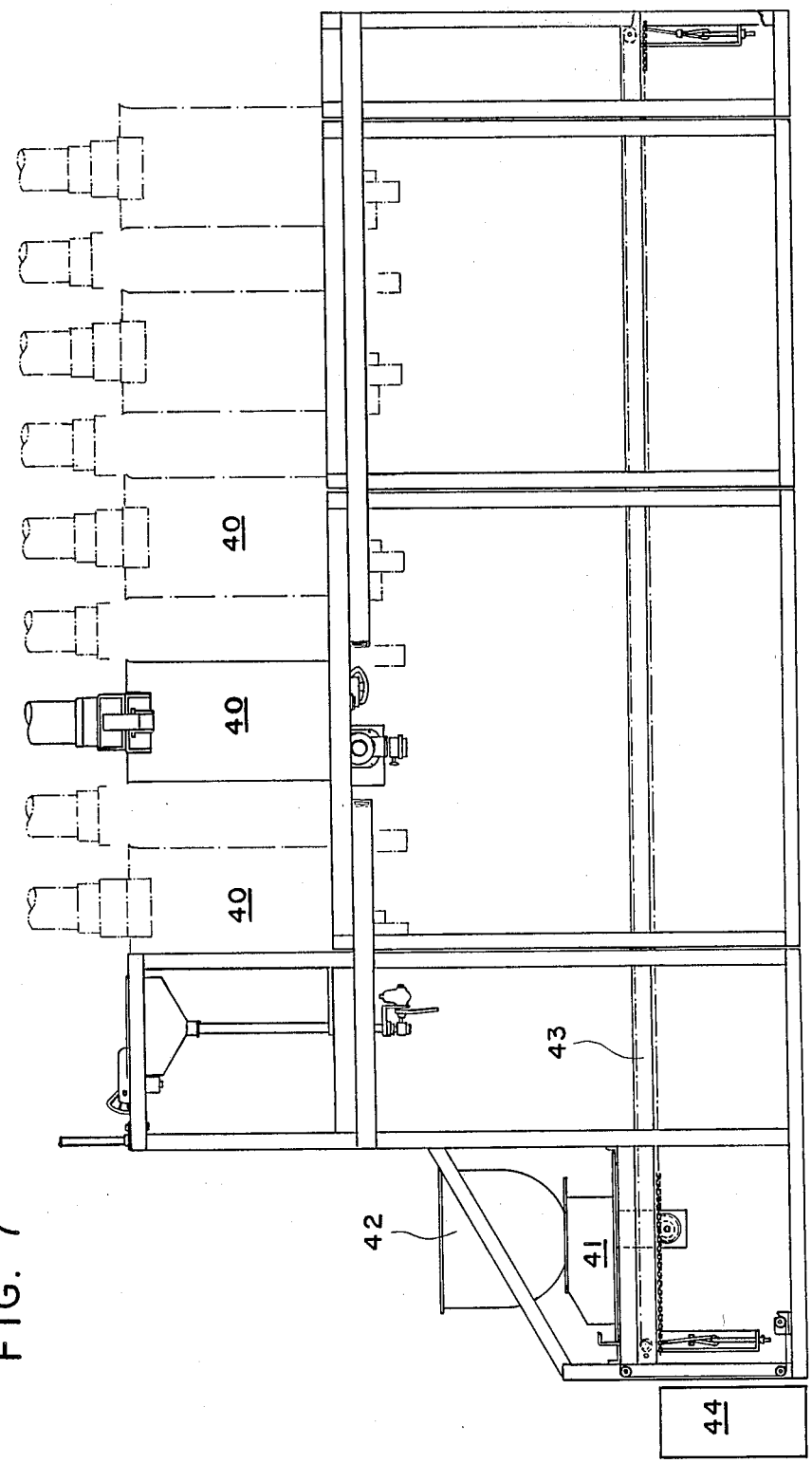
FIG. 7 is a side view of the alternative embodiment having a plurality of dispensing apparatus.
Figure 8:
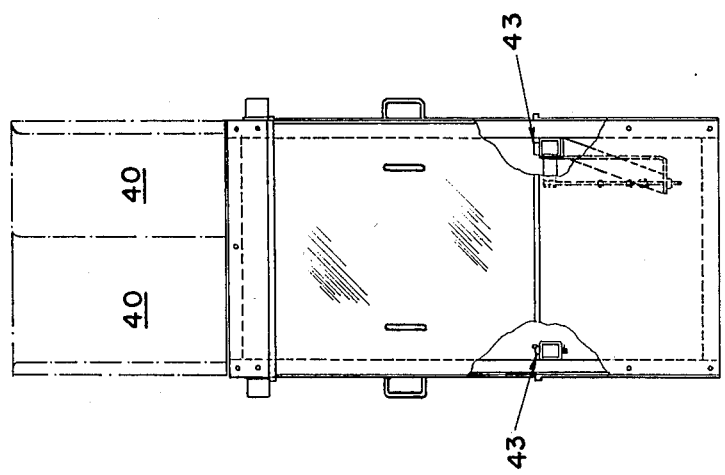
FIG. 8 is an end view as taken from the right of FIG. 7.

In the foregoing the construction and operation of a single apparatus of the invention has been discussed in detail. It is of course to be understood that the present invention also contemplates the provision, for dispensing desired weights of a plurality of fluid materials such as liquid base colour printing inks for shade mixing purposes, of a plurality of dispensing apparatus 40 as hereinbefore described, one of each particular fluid material to be dispensed as shown in FIGS. 7 and 8. Such an apparatus also includes at least one weighing scale 41 and at least one receptacle 42 on the scale for receiving the or each fluid material being dispensed. The weighing scale with the carried receptacle and the plurality of dispensing apparatus 40 are movable along a guide 43 relative to one another to bring each selected dispensing apparatus in turn into registry with the receptacle and weighing scale for dispensing purposes. Control means 44 may be provided including a microcomputer and a memory of storing the weight of each particular fluid material such as base colour inks in each dispensing apparatus corresponding to a desired number of actuating steps of each secondary outlet means gear pump 5 and for controlling the dispensing of fluid material from each dispensing apparatus in accordance with a one hundred part by weight formula inserted in the control means and the sequence of dispensing for each dispensing apparatus. To this end the control means 44 may include a means for reading the hundred part formula, provided conveniently on a card, and converting the readings directly into control signals for actuating the desired dispensing apparatus containing the particular base colour inks to be dispensed to form the required shade, automatically. To this end the control means can also utilize the individual dispensing means secondary outlet means gear pump 5 data derived for the individual inks to control the operation of the individual secondary outlet means 3 for each individual ink to the desired degree of accuracy. Additionally the control means can also receive signals from the contact switches 29 on individual dispensing apparatus and make provision for refilling the respective containers 1 when the level of ink therein drops below the half way mark.

I claim:

1. Apparatus for dispensing a desired quantity by weight of a fluid material such as a liquid base colour printing ink for shade mixing purposes, wherein the apparatus comprises a fluid material supply container having a side wall; a main fluid material dispensing discharge outlet means and a secondary fluid material dispensing discharge outlet means at one end of the container; pump means operatively connected to the secondary fluid material dispensing discharge outlet means wherein the pump is adjustably operable to dispense a preselected volume of fluid material corresponding to a preselected weight of fluid material to be dispensed, and means for applying pressure to fluid material in the container to urge the fluid towards said main and secondary outlet means, the means for applying pressure including a presser plate movably disposed in the container and in a sealed relationship with the side wall and a piston and cylinder arrangement operatively disposed to apply a force on the presser plate to selectively urge the presser plate toward or away from the main and secondary outlet means.

2. Apparatus according to claim 1, wherein the pump means comprises a gear pump having an inlet in fluid communication with the supply container and an outlet in communication with an outlet nozzle assembly of the secondary outlet means, and wherein the gear pump includes a drive means operable to actuate the pump in increments where each increment corresponds to a predetermined volume of fluid material to be dispensed from the secondary outlet means, whereby the preselected weight of fluid material can be dispensed by actuating a calculated number of increments of the pump.

3. Apparatus according to claim 2, wherein in the outlet nozzle assembly of the secondary outlet means further includes a substantially cylindrical nozzle member having a fluid flow passage therethrough opening into a discharge aperture through one end of the nozzle member and having an external conical surface at said discharge aperture end tapering towards the discharge aperture, a housing member around said conical end of the nozzle member, an annular membrane having a central aperture and being secured to said housing member so that the edge of the central aperture is disposed closely adjacent to the conical surface of the nozzle member and around the discharge aperture, the conical surface of the nozzle member, housing member and membrane defining a substantially annular chamber, and the housing further including an inlet opening into said substantially annular chamber adapted to deliver a gas under pressure into the substantially annular chamber and across the outer end of the nozzle and discharge aperture and through the central aperture of the membrane to blow away and remove therefrom any fluid material remaining thereon.

4. Apparatus according to claim 3, wherein the main outlet means includes an outlet passage and a ball valve in the outlet passage selectively actuable to open or close said passage to a flow of fluid material therethrough from the container.

5. Apparatus according to claim 4, wherein the supply container is substantially cylindrical in shape having a closed base at one end in and on which the main and secondary outlet means are provided, and an openable and closeable lid at the other end.

6. Apparatus according to claim 5, wherein the lid is hingeably connected to said container at one end.

7. Apparatus according to claim 6, wherein said piston and cylinder assembly includes a cylinder fixably secured to the container lid substantially perpendicular thereto and a piston rod extensible from the cylinder and connected at its outermost end to the presser plate substantially perpendicularly thereto.

8. Apparatus according to claim 7, wherein the presser plate is provided with a guide rod projecting therefrom substantially parallel to the piston rod and projecting through an opening in the container lid, said guide rod having visual indicating means for indicating the position of the presser plate in the container corresponding to the volume of fluid material remaining in the container, a contact switch operatively associated with the guide rod to indicate the position of the guide rod corresponding to the half empty state of the container.

9. Apparatus according to claim 8, wherein the presser plate incorporates an air bleed valve operable to bleed air from the fluid material side of the container.

10. A method of dispensing a desired quantity by weight of a fluid material, such as a liquid base colour printing ink for shade mixing purposes including the steps of (a) positioning a fluid material container provided with a main fluid material dispensing discharge outlet means and a secondary fluid material dispensing discharge outlet means above a receptacle; (b) applying pressure to the fluid material in the container towards said main and secondary means; (c) selectively actuating either the main and secondary outlet means together when a desired final weight of fluid material to be dispensed is over a first predetermined weight, or the secondary outlet means alone when the desired final weight of fluid to be dispensed is less than the first predetermined weight; (d) closing the main outlet means when a second predetermined weight of fluid material less than the desired weight has been discharged; (e) closing the secondary outlet means when a third predetermined weight of fluid material has been added to the second predetermined weight of fluid material in the receptacle to bring the total weight of the dispensed fluid material in the receptacle closer to and below the desired weight, or closing the secondary outlet means, if the main outlet means has not be actuated, when a fourth predetermined weight of fluid material below the desired weight has been dispensed into the receptacle; (f) weighing the fluid material in the receptacle to give an actual weight value; (i) closing the secondary outlet means; and weighing the fluid material in the receptacle for checking purposes.

11. A method according to claim 10, in which the secondary outlet means includes a gear pump and a drive motor and wherein the method further comprises actuating the gear pump in increments corresponding to a specific volume of fluid material dispensed from the secondary outlet means, in which a weight of fluid material is dispensed from the secondary outlet means by rotation of the gear pump by the number of increments equivalent to the desired weight of fluid material to be dispensed from the secondary outlet means, and in which the weight of a particular fluid material dispensed in a single increment is ascertained by previously weighing the amount of the particular fluid material dispensed in a known number of gear pump increments and calculating from the weighed amount the weight dispensed in a single gear pump increment.

12. A method according to claim 11, including reversing the gear pump at the end of each secondary outlet means dispensing actuation to such back residual fluid material from a discharge aperture of a nozzle member of the secondary outlet means to keep the discharge apeture clear and introducing a gas under pressure across the outer side of the nozzle member discharge aperture to remove any remaining fluid material hanging therefrom.

13. Apparatus for dispensing desired weights according to claim 1 for dispensing a plurality of fluid materials such as liquid base colour printing ink for shade mixing purposes, including a plurality of said dispensing apparatus, one for each particular fluid material to be dispensed, at least one weight scale and at least one receptacle on the scale for receiving each liquid material, wherein the weighing scale with carried receptacle and the plurality of dispensing apparatus are movable relative to one another selectively to bring each selected dispensing apparatus in turn into registry with the receptacle and weighing scale for dispensing purposes, and control means including a micro computer and a memory for storing the weight for each particular fluid material in each dispensing apparatus corresponding to an actuating step of each secondary outlet means gear pump, and for controlling the dispensing of fluid material from each dispensing apparatus in accordance with a 100 part by weight formula inserted in the control means and the sequence of dispensing from each dispensing apparatus.

14. A method of dispensing a desired weight of a viscous fluid material including the steps of:
(a) providing a fluid material dispensing apparatus having a supply container, a main discharge means, a secondary discharge means having a discharge aperture, and a means to apply a dispensing pressure to the fluid material;

(b) applying a dispensing pressure to the fluid material;
(c) determining a desired weight of fluid material to be dispensed and comparing the desired weight with a predetermined value, and selectively providing a first signal corresponding to a desired weight greater than the predetermined value or a second signal corresponding to a desired weight less than the predetermined value;
(d) actuating the main and secondary discharge means in response to the first signal, closing the main discharge means when a first predetermined weight of fluid material is dispensed wherein the first predetermined weight is less than the desired weight to be dispensed and subsequently closing the secondary discharge means when a second predetermined weight of fluid material is dispensed wherein the second predetermined weight is greater than the first predetermined weight and less than the desired weight of fluid material to be dispensed;
(e) actuating the secondary discharge means in response to the second signal to dispense the fluid material, closing the secondary discharge means when a third predetermined weight is dispensed wherein the third predetermined weight is less than the desired weight;
(f) weighing the dispensed fluid from step (d) and (e) to calculate an actual weight;
(g) calculating the weight difference between the desired weight and actual weight; and
(h) actuating the secondary outlet means to dispense a quantity of fluid material corresponding to the weight difference.

15. The method of claim 14 further including the step of introducing a negative pressure to the secondary discharge means to draw residual fluid material into the secondary discharge means.

16. The method of claim 15 wherein the secondary discharge means includes a gear pump and a discharge nozzle wherein the gear pump is reversed to provide the negative pressure.

17. The method of claim 15 comprising introducing an air stream to the outer surface of the discharge nozzle to remove residual material adhering thereon.

18. The method of claim 17 wherein the secondary discharge means further includes a housing surrounding the discharge nozzle, a membrane having a central aperture spaced from the discharge nozzle and fixed to the housing and a passage provided in a wall of the housing wherein the air stream is applied to the nozzle through the passage.

19. The method of claim 18 wherein the air stream is applied essentially perpendicular to the nozzle.

20. The method of claim 14 wherein the fluid material is dispensed from the secondary discharge means in predetermined weight increments.

21. A method of dispensing a desired weight of a fluid material including the steps of:
(a) positioning a fluid material dispensing apparatus above a receptacle wherein the dispensing apparatus includes a supply container, a main discharge means, a secondary discharge means having discharge aperture and means to apply a dispensing pressure to the container;
(b) applying a dispensing pressure to the container;
(c) simultaneously actuating the main and secondary discharge means to dispense the fluid material;
(d) closing the main discharge means when a first predetermined weight of fluid material is dispensed where the first predetermined weight is less than a final desired weight of fluid material to be dispensed;
(e) closing the secondary discharge means when a second predetermined weight of fluid material is dispensed where the second predetermined weight is greater than the first predetermined weight and less than the final desired weight;
(f) weighing the dispensed fluid material and determining an actual weight;
(g) calculating the weight difference between the desired weight and the actual weight;
(h) actuating the secondary outlet means to dispense a quantity of fluid material corresponding to the weight difference; and
(i) applying a negative pressure to the secondary discharge means to draw residual fluid material from the discharge aperture.

22. The method of claim 21 comprising introducing a flow of gas to the discharge aperture to remove any residual fluid material adhering thereon.

23. The method of claim 22 wherein the flow of gas is directed essentially perpendicular to the discharge aperture.

24. The method of claim 21 wherein the secondary discharge means further includes a gear pump and means to drive the gear pump, the method further including the step of actuating the secondary discharge means in increments corresponding to a predetermined incremental weight of fluid material to be dispensed.

25. The method of claim 24 wherein the negative pressure applied to the secondary discharge means is applied by reversing the gear pump.

26. An apparatus for dispensing a desired weight of fluid material comprising;
(a) a substantially cylindrical fluid material supply container having a side wall, at least one end wall, and an open end;
(b) a main fluid outlet means on the end wall of the container;
(c) a secondary fluid outlet means on the end wall of the container;
(d) pump means connected to a discharge nozzle on the secondary fluid outlet means and a means to step-wise actuate the pump means to dispense the fluid material in predetermined incremental amounts;
(e) means to dispense the fluid material from the container through a main and secondary outlet means, comprising a presser plate cooperating with the open end and walls of the container and being axially movable in the container to act on the fluid material; and
(f) means to selectively apply a dispensing force or a withdrawing force to the presser plate in the container.

27. The apparatus of claim 26 further comprising a sealing means disposed on an outer edge of the presser plate to seal against the side wall of the container.

28. The apparatus of claim 27 wherein the means to apply a dispensing force to the presser plate comprises a piston and cylinder assembly wherein the piston includes a piston rod connected to the presser plate and wherein the cylinder is fixed to a lid member removably attached to the open end of the cylinder.

29. The apparatus of claim 28 wherein the secondary discharge means includes a discharge nozzle having conical end and an axial discharge fluid passage, an annular housing surrounding the discharge nozzle and an annular membrane fixed to the housing, the membrane having a central aperture disposed axially to the axial discharge fluid passage wherein the discharge nozzle, housing and membrane define an annular chamber.

30. The apparatus of claim 29 wherein the housing further includes a fluid passage disposed in a wall of the housing and adapted to introduce a fluid into the annular chamber to remove residual fluid material from the discharge nozzle.

31. The apparatus of claim 30 wherein the fluid passage in the housing is disposed to direct a fluid flow essentially perpendicular to the axial passage in the discharge nozzle.

* * * * *

UNITED STATES PATENT AND TRADEMARK OFFICE
CERTIFICATE OF CORRECTION

PATENT NO. : 4,844,297
DATED : July 4, 1989
INVENTOR(S) : John A.G. Smith It is certified that error appears in the above-identified patent and that said Letters Patent is hereby corrected as shown below:

Column 11, line 53, delete claim 10 and insert

--10. A method of dispensing a desired quantity by weight of a fluid material, such as a liquid base colour printing ink for shade mixing purposes, including the steps of (a) positioning a fluid material container provided with a main fluid material dispensing discharge outlet means and a secondary fluid material dispensing discharge outlet means above a receptacle; (b) applying pressure to the fluid material in the container towards said main and secondary outlet means; (c) selectively actuating either the main and secondary outlet means together when a desired final weight of fluid material to be dispensed is over a first predetermined weight or the secondary outlet means alone when the desired final weight of fluid to be dispensed is less than the first predetermined weight; (d) closing the main outlet means when a second predetermined weight of fluid material less than the desired weight has been discharged; (e) closing the secondary outlet means when a third predetermined weight of fluid material has been added to the second predetermined weight of fluid material in the receptacle to bring the total weight of the dispensed fluid material in the receptacle closer to and below the desired weight, or closing the secondary outlet means, if the main outlet means has not been actuated, when a fourth predetermined weight of fluid material below the desired weight has been dispensed into the receptacle; (f) weighing the fluid material in the

UNITED STATES PATENT AND TRADEMARK OFFICE
CERTIFICATE OF CORRECTION

Page 2 of 2

PATENT NO. : 4,844,297

DATED : July 4, 1989

INVENTOR(S) : John A.G. Smith

It is certified that error appears in the above-identified patent and that said Letters Patent is hereby corrected as shown below:

receptacle to give an actual weight value; (g) calculating the weight difference between the desired weight and the actual weight; (h) actuating the secondary outlet means to dispense the weight difference of fluid material into the fluid material in the receptacle; (i) closing the secondary outlet means; and weighing the fluid material in the receptacle for checking purposes.

Signed and Sealed this

Twenty-third Day of April, 1991

*Attest:*

HARRY F. MANBECK, JR.

*Attesting Officer*     *Commissioner of Patents and Trademarks*